April 16, 1940.   E. S. MINARD   2,197,368
RECEPTACLE ACTUATED VALVE FOR FILLING MACHINES
Filed Oct. 3, 1938
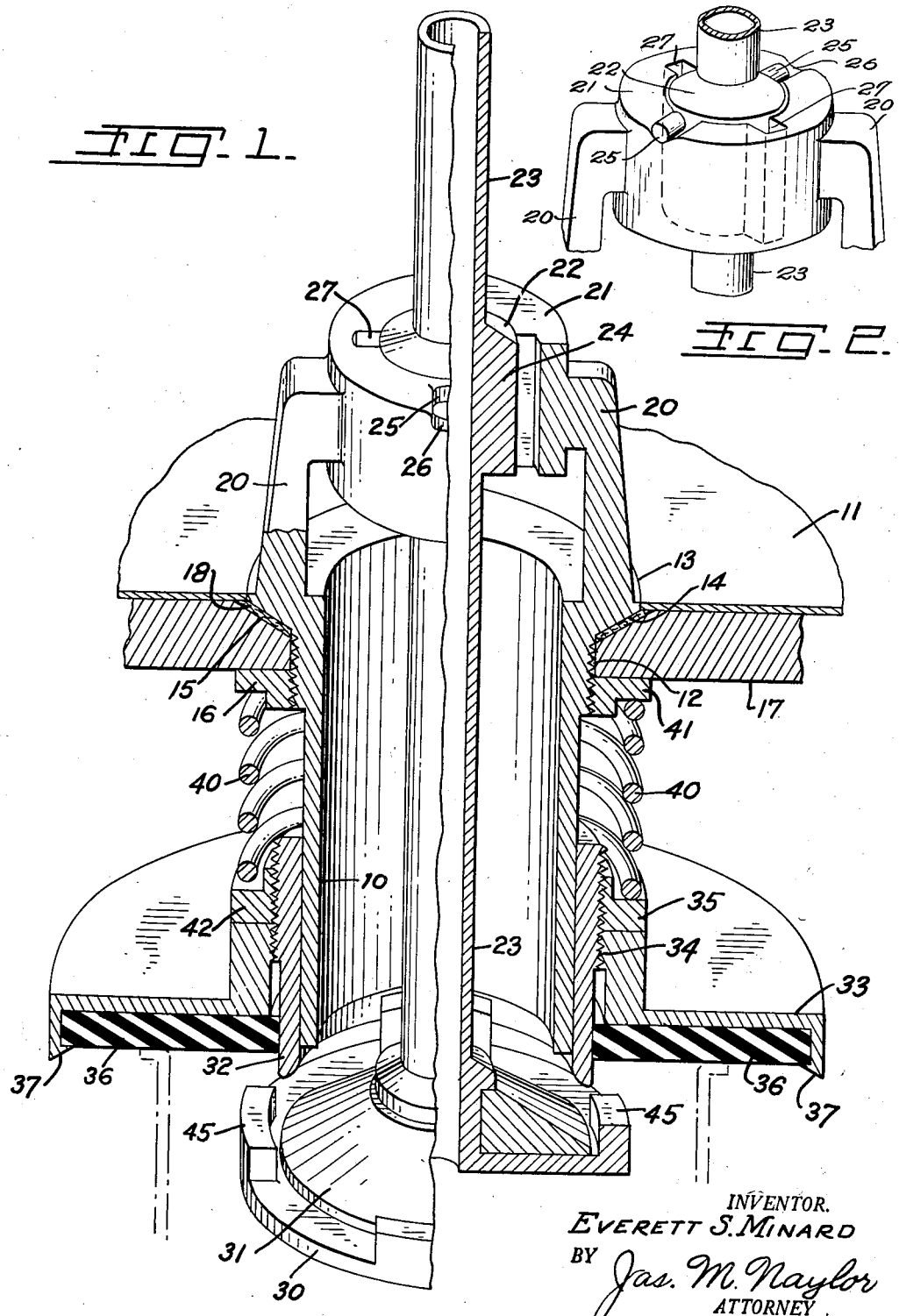
INVENTOR.
EVERETT S. MINARD
BY Jas. M. Naylor
ATTORNEY.

Patented Apr. 16, 1940

2,197,368

UNITED STATES PATENT OFFICE 2,197,368

RECEPTACLE ACTUATED VALVE FOR FILLING MACHINES

Everett S. Minard, Oakland, Calif., assignor to Walter King, San Francisco, Calif.

Application October 3, 1938, Serial No. 232,972

2 Claims. (Cl. 226—124)

This invention relates to valves for filling machines and particularly receptacle actuated valves for such fillers.

Certain types of filling machines, particularly those handling liquids, employ a plurality of receptacle actuated valves which are seated in or attached to the bottom of a supply tank. In rotary fillers these valves are usually dependent from the supply tank and actuated by receptacles raised thereagainst, in the rotation of the machine, to cause the liquid in the tank to flow by gravity through the valve and into the container.

The improved valve forming the subject matter of this application has for one of its objects the provision of a valve of the general character described which will permit of a more exact measurement of the fluid being handled; which effects the ready release of air within the container and in the fluid being handled; which utilizes a trapped column of air to determine the extent to which the containers are filled, and which may be readily disassembled for cleaning purposes.

These and other objects of the invention will become more apparent as this specification proceeds.

Figure 1 in the drawing is a vertical section in perspective showing the valve forming the subject matter hereof.

Figure 2 is an enlarged perspective of the upper end of the valve to show the details of construction.

The tubular filling member 10 is seated in and projects through the bottom 11 of a supply tank and has a threaded connection with an auxiliary tank bottom 17, as at 12. The tubular member 10 has a flange 13 at its upper end with a beveled undercut 14 to coincide with the beveled surface 15 at the aperture in the auxiliary tank bottom 17. The tubular member 10 is securely connected in the seat just described by means of a locknut 16 engaging the threaded portion 12 of tubular member 10 and bearing against the auxiliary bottom 17.

It will be noted that the flange 13 on tubular member 10 is flush with the edge of the primary bottom 11 and that a conventional packing 18 is disposed between the beveled surfaces 14 and 15.

Two arms 20, integral with and projecting upwardly from the flange 13, support a hub 21 having an aperture 22 therethrough coaxially disposed with respect to the tubular member 10. The hub 21 supports the valve stem 23 in the following manner: A collar 24 on valve stem 23 is provided with two trunnions 25 on its opposite sides. These trunnions normally rest in notches 26 in hub 21. To permit the ready dismantling of the valve for cleaning purposes I provide a pair of oppositely disposed keyways 27 through hub 21. In dismantling the valve the stem 23 is lifted and given a quarter turn until the trunnions 25 drop in the keyways 27 for the separation of the two component halves of the valve mechanism, as will be more clearly shown as this specification proceeds.

The valve stem 23 has a disc-shaped head 30 at its lower end, there being a conical shaped washer 31 thereon. A sleeve 32 on the tubular member 10 has a threaded connection with a plate 33, as at 34, and is locked in position by a ring nut 35. A disk 36 of rubber or like composition is retained on the lower face of plate 33 by means of the annular flange 37, and serves to hermetically seal the containers raised thereagainst during the filling operation.

The sleeve 32 and the plate 33, connected therewith, are normally urged downwardly into closed position, that is with the bottom edge of sleeve 32 in contact with valve head 30 at the effective sealing edge of conical washer 31, by means of the helical spring 40, encircling the tubular filling member 10. The coil spring 40 is seated at its upper and lower ends on flanges 41 and 42, provided on locknuts 16 and 35, respectively.

From the foregoing description it will be appreciated that the valve is actuated upon the upward movement of plate 33 by a receptacle pressed thereagainst and hermetically sealed thereby and that head 30 enters such receptacle (see dotted lines). Upon the opening of the valve the liquid flows from the supply tank through tubular member 10 and is spread into the receptacle by washer 31 and head 30. For the purpose of splitting the flow of the liquid through tubular member 10 into the receptacle, lugs 45 are arranged about the periphery of head 30. These lugs are in spaced relation and project upwardly from plate 30. Thus as the liquid flows downwardly through tube 10 and over the surface of the conical washer 31 the lugs 45 break what would otherwise be a continuous tubular film of fluid entering the receptacle. It has been found that where such a continuous tubular film of liquid enters the receptacle no opportunity is given for the escape of air, normally present in the receptacle, to atmosphere, and as a consequence such air is forced upwardly through the filling tube and into the liquid in the tank, causing an undesirable aeration of fluids being handled. This is particularly true in the case of liquids for human consumption. The valve stem 23 is tubular and projects above the surface of fluids in the supply tank, to carry off air exhausted from the receptacle as well as such free air as there may be in the liquid entering the container.

The operation of the valve forming the subject matter of this application is as follows:

An open top container is urged upwardly against the rubber disk 36 on plate 33 by any conventional lifter mechanism, raising the plate 33 and compressing the spring 40 to open the valve. Liquid flows into the container through tubular member 10 and is split or divided into a plurality of streams around lugs 45 on head 30. Air in the receptacle escapes through the tubular valve stem 23 to atmosphere.

Inasmuch as the rubber disk 36 hermetically seals the top of the container, it will be appreciated that when the container has been filled to the lower end of sleeve 32, the air trapped in the top of the container will prevent the same from being completely filled. The control of the quantity of liquid discharged into the containers is provided through the simple adjustment of the position of plate 33 in relation to sleeve 32, thus regulating the quantity of air trapped between plate 33, the can wall, and the edge of sleeve 32. If plate 33 be raised in its relation to sleeve 32, the latter extends further into the receptacle and the entrapment of air between the edge of sleeve 32, the receptacle and disk 36 will prevent further filling.

When the pressure on the bottom of the receptacle is relieved, spring 40 will urge sleeve 32 downwardly into its effective sealing position on head 30 against the conical washer member 31, thus closing the valve.

In the dismantling of the valve for cleaning purposes one need only lift valve stem 23 to raise trunnions 25 from the notches 26 in hub 21, and give the same a quarter turn or until trunnions 25 slip through the keyways 27 in hub 21. Sleeve 32 will thereupon slip off of tubular member 10 and spring 40 may likewise be removed. Thus all of the component parts of the valve will be completely exposed for the necessary cleaning purposes.

The invention claimed is:

1. In a receptacle actuated valve for filling machines, the combination of a tubular filling member, a hub supported above and in co-axial alignment with the tubular filling member, a tubular valve stem co-axially disposed in the tubular filling member, a collar on the valve stem having a pair of opposed trunnions, said hub having notches therein to receive the trunnions and a pair of opposed keyways therethrough for passage of said trunnions in the dismantling of the valve, a disc-shaped head on the lower end of said valve stem, a conical washer thereon, a plurality of lugs at the periphery of said head in spaced relation to said washer, a slidable sleeve on the lower end of said tubular filling member, an annular receptacle cover plate on said sleeve, and yieldable means normally urging the bottom edge of said sleeve into sealing position against said head and the washer thereon between said washer and said lugs to close the lower end of said tubular filling member.

2. In a receptacle actuated valve for filling machines, the combination of a tubular filling member, a hub supported above and in co-axial alignment with the tubular filling member, a tubular valve stem co-axially disposed in the tubular filling member, a collar on the valve stem having a pair of opposed trunnions, said hub having notches therein to receive the trunnions and a pair of opposed keyways therethrough for passage of said trunnions in the dismantling of the valve, a disc-shaped head on the lower end of said valve stem, a conical washer thereon, a plurality of lugs at the periphery of said head in spaced relation to said washer, a slidable sleeve on the lower end of said tubular filling member, an annular receptacle cover plate on said sleeve, yieldable means normally urging the bottom edge of said sleeve into sealing position against said head and the washer thereon between said washer and said lugs to close the lower end of said tubular filling member, and means for adjusting the position of said receptacle cover plate on said sleeve.

EVERETT S. MINARD.